April 22, 1947.  T. P. SIMPSON ET AL  2,419,507
METHOD OF CATALYTIC CONVERSION
Filed Oct. 16, 1940  2 Sheets—Sheet 1
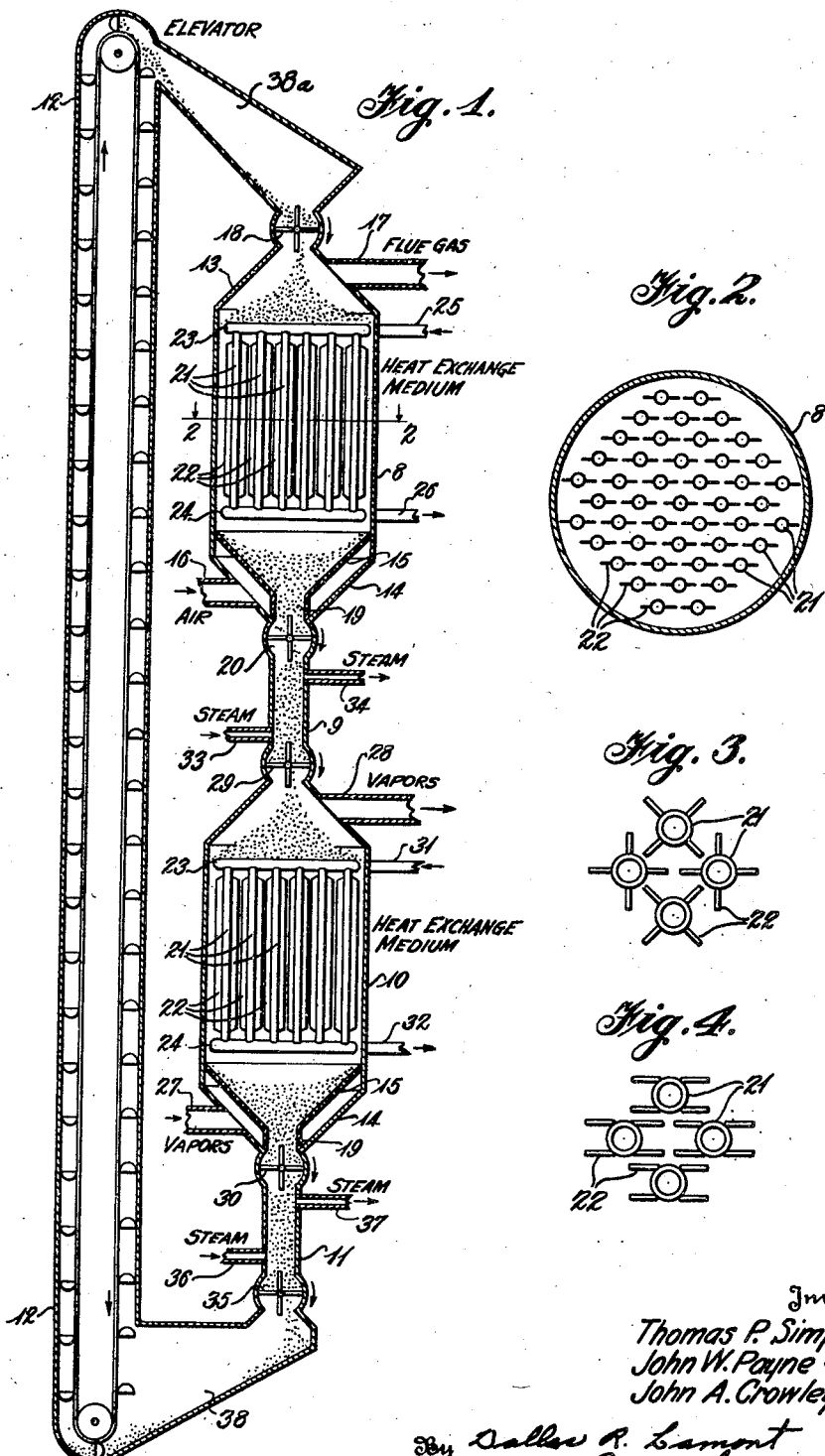
Inventors
Thomas P. Simpson
John W. Payne
John A. Crowley, Jr.

April 22, 1947.   T. P. SIMPSON ET AL   2,419,507
METHOD OF CATALYTIC CONVERSION
Filed Oct. 16, 1940   2 Sheets-Sheet 2
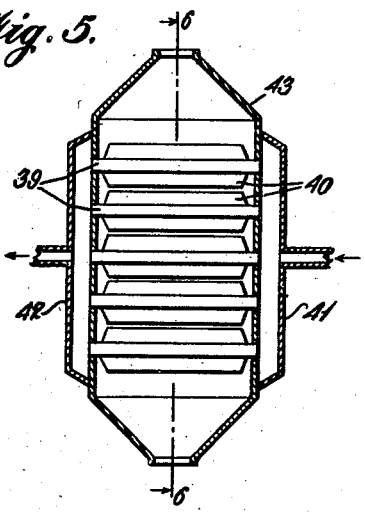
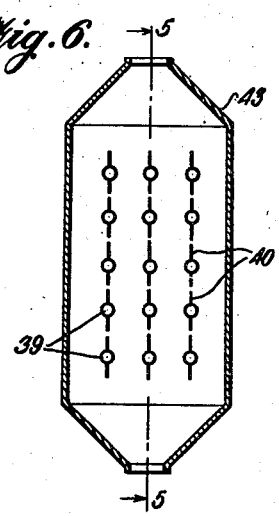
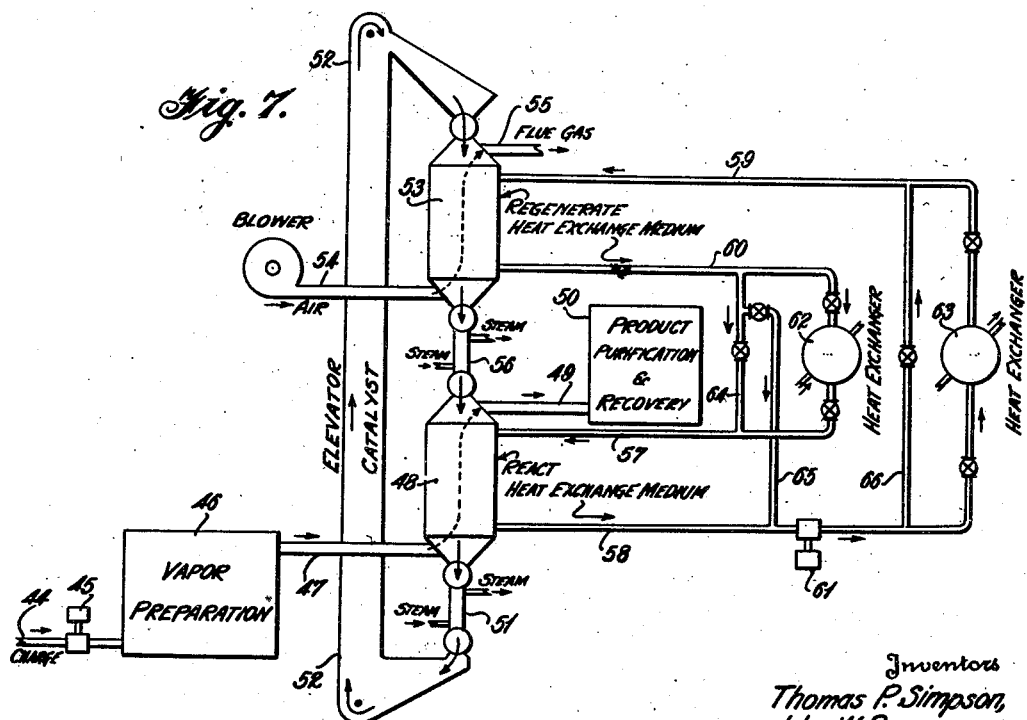

Patented Apr. 22, 1947

2,419,507

UNITED STATES PATENT OFFICE 2,419,507

METHOD OF CATALYTIC CONVERSION

Thomas P. Simpson, John W. Payne, and John A. Crowley, Jr., Woodbury, N. J., assignors to Socony-Vacuum Oil Company, Incorporated, New York, N. Y., a corporation of New York Application October 16, 1940, Serial No. 361,440

20 Claims. (Cl. 196—52)

This invention is a continuation-in-part of our co-pending application S. N. 162,541, filed September 4, 1937.

The invention relates to apparatus for and methods of conducting reactions in the presence of a contact mass. The invention particularly relates to apparatus for and methods of conducting catalytic conversion of hydrocarbons and of regenerating the catalysts used for the conversion, invention residing in each of the single operations and the apparatus therefor, as well as, in combinations of the single operations and apparatus therefor which afford truly continuous processes and means for carrying out same.

It is known that many operations for the conversion of hydrocarbon materials to other hydrocarbon materials of differing physical and/or chemical properties may be carried out catalytically. Most of these operations are carried out by contacting the hydrocarbon, usually but not necessarily, in vapor form and at high temperature, with a contact mass composed of particles which themselves have a catalytic effect, or which are impregnated with, or act as a support for, other catalytic material of a nature appropriate to the result desired. Such operations may contemplate, for example, the conversion of hydrocarbons of high boiling point to those of lower boiling point, or the polymerization or alkylation of light or gaseous hydrocarbons to hydrocarbons of higher boiling point. Other operations of like nature are catalytic dehydrogenation, hydrogenation, desulphurization, partial oxidation and similar conversions of hydrocarbon materials. The method of operation and apparatus herein disclosed are applicable to all such catalytic conversions and processes and the subsequent regeneration of the catalyst. Moreover, the present invention may be used in certain catalytic processes using solid particle contact masses other than processes of hydrocarbon conversion. Of these operations, the vapor phase catalytic cracking of heavier hydrocarbons to gasoline with the subsequent regeneration of the catalyst is typical. Therefore, for convenience and simplification, this specification will hereinafter discuss this typical operation as exemplary, without, however, intending to be limited thereby or thereto except by such limits as may appear in the claims.

In the past such catalytic processes as we are here concerned with have generally made use of reaction chambers containing a fixed body of catalyst or contact mass, through which the reaction mixture is passed, and in which, after the reaction has slowed down to an uneconomical point, the contact mass is regenerated in situ. Such "catalyst-in-place" processes are not truly continuous, and a complete unit only attains continuity by the provision of numerous reaction chambers which are alternately placed on stream and on regeneration by intricate scheduling and control systems.

It is an object of this invention to provide an apparatus for and method of conducting a continuous catalytic operation in which the catalyst moves in a circuit through the catalytic reaction then through a regenerating reaction and then back to the catalytic reaction.

Another object of our invention is to provide a process of conducting a catalyst regeneration wherein the catalyst is moving during regeneration and which is capable of efficiently handling large quantities of catalyst.

A more specific object is to provide an apparatus for and process of conducting a continuous catalytic hydrocarbon oil conversion reaction wherein the catalyst moves in a circuit through the catalytic reaction then through a regenerating reaction and then back to the catalytic reaction.

Other objects will in part be obvious and in part appear from the following description of our invention.

The present invention comprises the novel elements of construction, combination of elements and methods disclosed herein. The invention in general involves method and means for flowing catalyst and reactant through a reaction zone then flowing the spent catalyst through a regenerating zone and returning the regenerated catalyst to the reaction zone. In one embodiment our invention comprises the apparatus for and method of conducting a truly continuous catalytic operation by flowing the catalyst through a catalytic reaction zone in contact with a flowing stream of the reactant, withdrawing spent catalyst from the zone, flowing the spent catalyst through a regenerating zone in contact with a gaseous regenerating agent while circulating a fluid heat exchange medium of suitably controlled temperature within sufficiently close proximity to, and in indirect heat exchange relationship with, every particle of spent catalyst during the entire time it is being regenerated that the temperature of all such particles being regenerated may be maintained within a suitable regenerating temperature range without any deleterious temperature being created, withdrawing regenerated catalyst from the regenerating zone and returning the regenerated catalyst to the reaction zone. In another embodiment our invention comprises regenerating suitable spent catalysts in general, whether derived from a continuous reaction or not, by a method similar to that outlined in the above mentioned continuous combination embodiment.

For a fuller understanding of the invention reference is now made to the accompanying drawings showing preferred embodiments of our invention wherein:

Fig. 1 shows a longitudinal sectional view of one form of the combination apparatus;

Fig. 2 shows a cross-section of one of the cases shown in Fig. 1 taken on the line 2—2;

Figs. 3 and 4 show certain optional internal arrangements that may be used in the cases shown in Fig. 1;

Figs. 5 and 6 show longitudinal sectional views taken 90° apart of another form of case of the type shown in Fig. 1; and Fig. 7 shows in diagram how the combination apparatus of this invention may be set up in operating form.

Referring to Fig. 1, there is shown a regeneration case 8, a purging section 9, a reaction case 10, a second purging section 11, and a conveyor 12 for catalyst particles which, as shown, is a bucket conveyor. It is not essential for the reaction case to be provided with heat exchange tubes; however, as shown in this particular modification, regeneration case 8 and reaction case 10 are similar in construction and internal fittings. These cases consist (referring now to case 8) of an exterior shell 8, which may be of any suitable shape such as cylindrical or rectangular in cross-section, with a convergent sealed top 13, and a convergent bottom 14, and fitted with an interior false bottom 15, which is perforate, the perforations therein being too small for the passage of catalyst particles, but permitting the passage of liquid or gas. Bottom 14 is fitted with pipe 16, and top 13 with pipe 17. At the head of top of 13 is a sealed feeding device 18, which may be a star wheel, as shown, an intermittently operated valve set-up, or other device or means which will permit passage of catalyst particles while preventing passage of fluids to and from the chamber.

In operation spent catalyst material introduced through 18 preferably fills the interior of shell 8, passes down therethrough, is collected by false bottom 15 and chute 19, and is removed by a second valving device or means, such as star wheel 20. This arrangement effects a continuously moving stream of catalytic material through case 8. Regenerating agent, e. g., air or other carbonaceous oxidizing agent when regenerating spent cracking catalysts or similar spent catalysts, may be introduced through pipe 16 and removed through pipe 17. This effects a continuously flowing stream of regenerating agent in physical contact with the continuously flowing stream of catalytic material in shell 8. The flow shown is countercurrent. If desired, it may be made concurrent by reversing the functions of 16 and 17.

Case 8 also is fitted internally with a series of heat-conducting conduits 21, equipped with heat-conducting fins 22, joined to headers 23 and 24, through which a fluid heat exchange medium may be passed by means of pipes 25 and 26. The heat exchange medium may be used to control the temperature of reaction by extraction of heat from or addition of heat to the material within shell 8, and its flow may be concurrent, countercurrent, or, as later shown, transverse to the direction of flow of catalytic material.

Case 10 is similarly fitted to case 8 and similarly operated. Reaction material, e. g., petroleum oils when cracking, is introduced by pipe 27, and removed by pipe 28. Catalyst movement is controlled by valves 29 and 30, and heat exchange medium is circulated by pipes 31 and 32 through conduits or tubes 21.

Confined passage 9, maintained relatively full of catalyst by devices 20 and 29, is fitted with pipes 33 and 34, by means of which steam or other gas may be passed through the catalyst for purging, if necessary or desirable. A similar purging passage 11, located below shell 10, is controlled by devices 30 and 35, and fitted with steam (or other agent) pipes 36 and 37 for purging catalyst after reaction. Passages 9 and 11, used for purging, should be so proportioned that a sufficient contact of steam and catalyst particles occurs to remove most of the residual products occluded in the catalyst from the preceding reaction since obviously it is undesirable to introduce any substantial amount of say oil vapor into the regenerating case or air into a cracking case. It is to be understood that in the event either or both purging operations are found to be unnecessary same may be eliminated.

From purging section 11 the catalyst drops through 35 into boot 38 of conveyor 12 by which it is elevated and discharged into bin 38a above shell 8. Conveyor 12 may be of the belt and bucket type shown or of any other kind suitable for the physical properties of the catalytic materials, as, for example, a blower type in which the catalyst is conveyed by a stream of gas. Customary devices for the removal of fines and the addition of makeup may be inserted in the catalyst conveyor system.

Special attention should be given to the arrangement of heat exchange tubes within the case 8 and, if desired, in case 10. These tubes should be so arranged as to promote the passage of catalytic material and reaction material longitudinally through the shell in such manner that the flowing material is at all times in heat exchange relationship with the heat exchange medium. The conduits may be unfinned, if placed extremely close together, but much more practical results are obtained by augmenting the external heat transfer surface of the heat exchange tubes by the addition of fins thereto. These fins, primarily added for heat transfer reasons, may be taken advantage of to assist in control of the flow of catalyst and reaction fluid and contact therebetween by being disposed, for instance, so that they, together with the tubes, divide the space within the shell into a series of long, thin passages of substantially constant cross-section throughout their length. These passages should be of such dimension that all portions of the reaction material therein are in efficient heat exchange relationship with the heat exchange medium in the tubes so that all catalyst particles in the cases may be maintained within a suitable treating range without any deleterious temperature being created. The proper dimensions for this condition depend somewhat upon the physical nature of the catalyst.

A catalyst for hydrocarbon oil conversion that is commonly used today comprises rod shaped clay or alumina-silica particles, about 2½ mm. diameter by 4 mm. average length. With such particles the passages should be so arranged that no catalyst particle will be further removed from a heat extractive surface than about 1 inch, and the total volume in cubic inches of the passages containing catalyst and reaction mixture should be numerically about one-eighth to twice the surface in square inches of the heat transfer surface in contact with the passages. The details of the distribution of heat exchange medium and surfaces will be discussed more in detail hereinafter. Catalyst particles of different heat conductivity, or of different packing characteristics, or variation in the contemplated intensity of reaction per unit volume of catalyst, as well as considerations of heat transfer and pressure drop, will vary the ratio somewhat. The length of the reaction and regeneration passages should be relatively great, say from 3 to 15 feet or more.

Figure 2 shows a cross-section of case 8 of Fig. 1 at the level 2—2 showing how the preferred longitudinal passages may be formed by equipping each heat exchange tube with two diametrically opposed, longitudinally disposed axial fins. Figures 3 and 4 show other ways of arriving at the same result. Further the heat transfer tubes need not be arranged parallel to the flow of catalyst, but may well be transverse thereto, as shown in Figures 5 and 6, wherein transverse tubes 39, carrying fins 40, extend between header boxes 41 and 42 in a shell 43, to exercise the same functions as corresponding parts in cases 8 and 10.

In Fig. 7 we show a diagram of essentially a complete exemplary set-up of a typical arrangement of the combination embodiment of our invention when used for cracking oil. Oil for the catalytic reaction case 48 will be fed through pipe 44 by pump 45 to, if desired, a vapor preparation unit 46. Vapor preparation unit 46 will consist essentially of a heater, for which purpose any of the usual forms of heaters common in the art, say a pipe still, may be used to vaporize the charge and heat it up to reaction temperature; and, if the charge used is not wholly vaporized at the reaction temperature, a vapor separator to remove unvaporized liquid residue may be included. Vapors from unit 46 move through pipe 47 into and up through reaction case 48 wherein they undergo catalytic reaction. Reaction products pass through pipe 49 to product purification and recovery equipment 50. Equipment 50 may be made up of any of the usual fractionation, separation and disposed devices currently in common use for handling products of cracking reaction. If desired, fractions boiling above the desired low boiling product may be returned to the system for re-treatment, either separately or in admixture with fresh charge.

Catalytic material flows down through case 48 into purge section 51 where it is purged. Catalyst leaving 51 is elevated by conveyor 52 into regeneration case 53, wherein it is regenerated as it flows down through 53 by burning with air or other suitable carbonaceous oxidizing gas supplied through blower pipe 54. Products of regeneration are disposed of through pipe 55. The regenerated catalyst leaving the bottom of case 53 is purged in 56 and returned to case 48.

In the preferred embodiment of the invention heat exchange medium would only be used in the regeneration case, e. g., case 53 in Fig. 7. Accordingly, in such an embodiment, as shown in Fig. 7, using heat exchange medium in the regeneration case only, fluid heat exchange medium, the temperature of which is controlled by heat exchanger 63, would be circulated from exchanger 63 through pipe 59 to case 53, through the case 53, and then directly back to exchanger 63. In such an embodiment no other external system for heat exchange medium would be provided.

However, since in some instances it may be desired to use heat exchange medium in the reaction case also, suitable means therefor, is shown in Fig. 7, in fact, as shown in Fig. 7, the same heat exchange medium is used for both catalyst cases whereby the excess heat picked up by the medium in the regeneration case may be made use of in the reaction case for heating. Thus, as shown, heat exchange medium withdrawn from case 53 through pipe 60 is passed through pipe 64, or through heat exchanger 62, into pipe 57 and then into and through reaction case 48. Heat exchange medium withdrawn from case 48 passes back to chamber 53 through pipe 58, heat exchanger 63, and pipe 59. If desired, part or all of the heat exchange medium may be by-passed around heat exchanger 63 through pipe 66. Circulation of the fluid heat transfer medium is effected by means of pump 61.

During operation it is desirable to have at least the regenerating chamber filled with the catalyst particles so that they move in substantially a solid column down through the chamber, as otherwise improper heat control may result. Therefore while the chamber might be operated without filling the chamber it is only at the probable expense of best results. The reaction case may be operated in any suitable manner that is feasible. Further, the cyclic process should be operated so that catalyst is not permitted to cool to atmospheric temperature in passing from one case to another, but rather, for economical reasons, the catalyst should be passed preferably to the next case while retaining heat acquired in the preceding case. In some operations it may be found desirable or necessary to place catalyst surge tanks or the like in the catalyst flow lines in order to give greater flexibility to the timing of the operations. If advisable in such operations, means for heating the catalyst at these stages may be provided so that it is retained in a heated condition. By passing the catalyst to the next case while still in a heated condition a material advantage is obtained in that time and space in the cases are not required for merely heating the catalyst up to the desired treating temperature, or, at least, in heating the catalyst all the way from atmospheric temperature up to the treating temperature.

In order to obtain proper temperature control, heat exchange medium for the regenerating case must be adjusted to a proper temperature, for extracting or adding the necessary heat. Moreover, heat exchange medium should be circulated in sufficient amount in sufficiently close indirect heat exchange with every catalyst particle and then cooled or heated to readjust its temperature by means extraneous of the reaction heat before the medium's temperature reaches an undesired value. In this way the heat exchange medium in our invention continuously controls the temperature of the zone making immediate compensations for temperature changes whereby no deleterious temperatures occur.

While temperature-controlled, circulating gaseous heat exchange mediums of high specific heat might be used in some instances, we greatly prefer the use of liquid heat exchange mediums since necessary pumping and pressure facilities for proper use of even the best gaseous mediums, e. g., hydrogen, would, in many cases, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of cracking catalysts, we prefer the use of fused salts. A particularly preferable mixture of this kind is a mixture of the alkali metal salts of nitric and nitrous acids. In certain cases suitable liquid heat exchange mediums might be found which have a boiling point around the desired operating temperature, in which case, the heat exchange medium would be kept predominantly in the liquid state but might undergo some transition whereby advantage could be taken of its heat of vaporization or condensation.

In the preferred practice the heat exchange medium is maintained at substantially the temperature of the treatment being controlled, e. g., above the minimum temperature at which proper reaction is obtained and below the minimum temperature at which deleterious results occur such as damage to the catalyst. Such practice may be carried out very effectively when the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and suitable cooling or heating of the heat exchange medium in its circuit maintains the liquid at the treating temperature.

Obviously the maximum distance that each catalyst particle might be from the liquid heat transfer medium may vary with the catalyst treated, the atmosphere in the burning zone, the amount and nature of impurities being removed, mass velocity of gaseous regenerating agent, physical properties of the liquid heat transfer medium, etc. Accordingly it would be difficult to specify one maximum distance that may be used for every regeneration. However, in general, this maximum distance should not exceed about 1½ to 2 inches in any regeneration case in order to afford proper temperature control, and a maximum distance of about 1 to 1½ inches seems to be well suited for the regeneration of spent clay cracking catalysts. The hydraulic radius (i. e., cross area not occupied by heat exchange equipment measured in square inches divided by perimeter or length of heat transfer surface in that area measured in inches) of the case at all points along the regenerating portion thereof should be below about 3 inches, and, preferably for cracking catalyst regeneration, should be around 0.5 to 1.0 inch or lower.

In order to show specific application of our invention to the construction and operation of catalyst regeneration cases, we give in Table I below specific data for a regeneration case that embodies a satisfactory construction of the present invention. The particular data given is for regeneration of a clay cracking catalyst carrying up to about 3% of coke and using a molten salt heat exchange medium. It is to be understood the invention is not limited by the data of Table I as there may be variations as indicated elsewhere herein:

Table I

| | |
|---|---|
| Length of case_____feet__ | 25 |
| Diameter of case_____do____ | 8 |
| Length of catalyst path_____do____ | 25 |
| Size of heat transfer tubes____inches O. D__ | 1 |
| Spacing of tubes (finned)_____inches__ | 3 |
| Hydraulic radius of heat transfer___do____ | 0.4 |
| Volume of chamber occupied by clay per cent__ | 75 |
| Maximum distance of clay particles from heat exchange surface_____ | 0.8 |
| Coke, per cent by weight of catalyst_____ | 3.0 |
| Clay throughput (#/hour/cu. ft. of chamber space)_____ | 20 |
| Air rate (cu. ft./min./cu. ft. of chamber volume) _____ | 2.5 |

As stated above the maximum distance which any catalyst particle may be from liquid heat exchange medium during regeneration in accordance with our invention and the minimum amount of heat transfer surface and liquid heat exchange medium may vary somewhat depending on certain factors. As a preferred range which will be found satisfactory for most regenerations we give the following data in Table II.

Table II

| | |
|---|---|
| Maximum distance of particles from heat exchange surface_____inches__ | 0.3–1.5 |
| Hydraulic radius_____do____ | 0.15–1.0 |
| Volume of liquid heat exchange medium in chamber per unit volume of space for catalyst and gas_____ | 0.1–0.3 |

As to the maximum distance of particles and the maximum hydraulic radius value (i. e., largest numerical value), it is preferable, of course, from the economic standpoint to use the largest value possible in order that the least possible amount of heat transfer surface may be used which will give the desired results.

It will be understood that, while best design and operation in accordance with this invention is obtained by observing the limits and ranges set forth above, a gradual approach to such limits and ranges will naturally begin to produce some of the advantages obtained by the present invention. There is, therefore, a borderline range of relationships which do not yield the results obtainable by practice of the preferred form of the invention but within which some of the advantages of the invention begin to be realized. For the purpose of defining this borderline range we give below figures defining relationships beyond the limits of which operating difficulties would arise which would seriously impair the efficiency of the process or would increase the cost to a most undesirable level as compared with our preferred design and operation.

*Table III*

Maximum distance of particles from liquid heat exchange medium___inches__ 0.1–3.0
Hydraulic radius_____do____ 0.07–1.5
Volume of liquid heat exchange medium in chamber per unit volume of space for catalyst and gas_____ 0.05–0.6

The catalytic cracking of petroleum oils to gasoline may be conducted at temperatures in the catalyst mass between about 810° F. and about 950° F. and preferably between 825° F. and 900° F., as is well known in the art. When cracking by passing petroleum vapors in contact with a flowing stream of catalyst as disclosed herein, the rate of flow of the petroleum vapors is governed by the same mechanical principles and limits set forth herein for the rate of flow of a gaseous regenerating agent.

The temperature of regeneration of a spent clay cracking catalyst ranges from around the cracking temperature up to a peak temperature of about 1050° F., the most efficient and effective regeneration being accomplished during the time the spent catalyst is at a temperature between about 1000° and 1050° F. However, great care should be exercised that no catalyst particles are subjected to a temperature much above 1050° F., e. g., above 1200° F., or serious damage to such catalyst particles may result. It is to be noted further that because the regeneration case is always on regeneration, and, therefore, each part of the case remains at substantially a given temperature, it is not necessary to use preheated air as air at atmospheric temperature may be introduced into the case quite feasibly. However, the use of preheated air is preferable because it increases the case capacity.

We claim:

1. A method of conducting a cyclic operation at closely controlled elevated temperatures comprising a catalytic petroleum conversion reaction wherein moving solid catalyst particles are intimately contacted with a moving stream of petroleum oil to be converted and a regeneration reaction wherein the spent catalyst from said conversion reaction is regenerated by intimately contacting the spent particles with a gaseous regenerating agent while both are moving, which comprises flowing the active catalytic particles through a conversion zone in intimate contact with a moving stream of said petroleum oil under conversion conditions so as to convert the oil and thereby cause catalyst particles to become spent from deposited carbonaceous material, purging said spent particles with an inert gaseous medium to remove some of the carbonaceous material associated therewith, passing said purged, spent particles into a regenerating zone without permitting them to cool to atmospheric temperature, flowing said spent particles through said regenerating zone in intimate contact with a moving stream of said gaseous regenerating agent under regenerating conditions so as to regenerate the particles, controlling the temperature of all particles in said regenerating zone so as to maintain their temperature at an efficient regenerating temperature which is below any temperature that substantially heat damages the particles, returning regenerated particles from said regenerating zone to said conversion zone without permitting them to cool to atmospheric temperature, and preventing any substantial amount of said petroleum oil reactant from passing into said regenerating zone at all times and preventing any substantial amount of combustion-supporting gas from passing into said conversion zone at all times.

2. The method of converting a heavier hydrocarbon oil into high quality gasoline by a process comprising catalytic cracking which method comprises heating said oil to effect vaporization thereof and to effect heating thereof to the conversion temperature, introducing said heated vapors into a substantially compact moving mass of catalyst in a conversion zone, introducing catalyst into said zone and removing catalyst from said zone without appreciable losses of hydrocarbon vapors with said catalyst, continuously regenerating said removed catalyst in a separate zone at high temperature and substantially directly returning said high temperature regenerated catalyst to said conversion zone in admixture with fresh catalyst, preventing any substantial amount of combustion supporting regeneration gases from entering the conversion zone, and fractionating the products from the conversion step into a gasoline fraction, a gas fraction and at least one heavier-than-gasoline fraction.

3. The method of claim 2 which includes the further step of vaporizing adsorbed oil from said removed catalyst prior to its transfer to said regeneration zone by contacting said catalyst with a hot inert gas.

4. The method of converting a fluid petroleum hydrocarbon into high quality gasoline by catalytic conversion which method comprises passing catalyst in a closed circuit including a conversion zone and a revivification zone and introducing fluid petroleum hydrocarbons in the form of vapors into a moving substantially compact column of said catalyst within the conversion zone, continuously removing the catalyst from said zone without appreciable losses of hydrocarbon vapors with said catalyst and continuously conducting it to the revivification zone, regenerating the catalyst at high temperature in said revivification zone and returning it in such condition to said conversion zone, substantially excluding combustion-supporting gases from entering the conversion zone, and collecting the products from the conversion step.

5. The method of converting fluid petroleum hydrocarbons into high quality gasoline by catalytic conversion which method comprises passing catalyst substantially continuously through a closed circuit which includes a conversion zone and a revivification zone isolated from said conversion zone, introducing said hydrocarbons in the form of vapors into a moving substantially compact column of catalyst within a conversion zone, passing the catalyst through said zone and continuously removing it therefrom without appreciable losses of hydrocarbon vapors with said catalyst, continuously passing the catalyst to the revivification zone at a linear speed greater than that at which it passed through the conversion zone, continuously regenerating said catalyst in the revivification zone at high temperature while it is conducted therethrough at a decreased rate of speed and thereafter returning the catalyst at a more rapid linear speed of travel in the regenerated condition to said conversion zone, substantially excluding combustion-supporting gases and products of combustion from entering the conversion zone, and collecting the products from the conversion step.

6. In a method wherein a fluid petroleum hydrocarbon is converted to high quality gasoline by catalytic conversion and wherein the catalyst in solid particle form is flowed through a conversion zone in direct contact with vapors of the hydrocarbon and spent catalyst is flowed substantially directly to a regeneration zone in which the spent catalyst is regenerated at a high temperature which is above the temperature of conversion and wherein the high temperature regenerated catalyst is returned substantially directly to the conversion zone for effecting further conversion while substantially excluding combustion-supporting gases from the conversion zone, the steps which comprise passing said regenerated catalyst through the conversion zone counter-current to the hydrocarbon vapors, and preheating the hydrocarbon vapors to approximately the conversion temperature before introducing them into the conversion zone.

7. The method of converting a liquid hydrocarbon oil into high quality gasoline by a process comprising catalytic cracking which method comprises heating said oil to effect vaporization thereof and to effect heating thereof to a conversion temperature, introducing said heated vapors into a moving bed of catalyst in a conversion zone, introducing catalyst into said zone and removing catalyst from said zone without appreciable losses of hydrocarbon vapors with said catalyst, continuously regenerating said removed catalyst in a separate zone at high temperature and returning said high temperature regenerated catalyst to said conversion zone in admixture with fresh catalyst, preventing regeneration gases from entering the conversion zone, and fractionating the products from the conversion step into a gasoline fraction, a gas fraction and at least one heavier-than-gasoline fraction.

8. The method of claim 7 which includes the further step of vaporizing adsorbed oil from said removed catalyst prior to its transfer to said regeneration zone by contacting said catalyst with a hot inert gas.

9. The method of converting a fluid hydrocarbon into high quality hydrocarbon products by catalytic conversion, which method comprises circulating a particle form solid catalyst in a closed cyclic path including an enclosed conversion zone and an enclosed regeneration zone, maintaining the major portion of said catalyst in said path, said path including in sequence the steps of effecting contact of said fluid hydrocarbon with a compact column of said catalyst in said conversion zone, passing spent catalyst from said conversion zone to said regeneration zone without appreciable losses of hydrocarbon vapors with said catalyst, regenerating said catalyst at high temperature in said regeneration zone by contact with a gaseous regenerating agent, returning the high temperature regenerated catalyst to the conversion zone for effecting the conversion reaction, substantially excluding combustion-supporting gases from the conversion zone, and collecting the products from the conversion zone.

10. The process of claim 9 wherein spent catalyst of said conversion zone is purged with an inert gaseous agent in order to remove some of the hydrocarbon material associated therewith before passing said catalyst to said regenerating zone.

11. The method of converting a fluid hydrocarbon into high quality hydrocarbon products by catalytic conversion, which method comprises circulating a particle form solid catalyst in a closed cyclic path including an enclosed conversion zone and an enclosed regeneration zone, maintaining the major portion of said catalyst in said path, said path including in sequence the steps of effecting contact of said fluid hydrocarbon with a compact column of said catalyst in said conversion zone, passing spent catalyst from said conversion zone to said regeneration zone without appreciable losses of hydrocarbon vapors with said catalyst, regenerating said catalyst at high temperature in said regeneration zone by contact of a compact column of said catalyst with a gaseous regenerating agent, returning the high temperature regenerated catalyst to the conversion zone for effecting the conversion reaction, substantially excluding combustion supporting gases from the conversion zone, and collecting the products from the conversion zone.

12. In a process of contacting a particle form solid with a fluid material involving deposition of a combustible deposit on said solid and thereafter removing said combustible deposit by burning in the presence of an oxidizing gas; the steps which comprise circulating said solid in a closed cyclic path including an enclosed contacting zone and an enclosed burning zone, maintaining the major portion of said catalyst in said path, said path including in sequence the steps of effecting contact of said material with a compact column of said solid in said contacting zone, passing solid carrying said combustible deposit from said contacting zone to said burning zone without appreciable loss of said fluid material with said solid, removing said combustible deposit from said solid in said burning zone by contact with a gaseous oxidizing agent, returning the high temperature treated solid to the contacting zone for contact with said fluid material, and substantially excluding combustion-supporting gases from the contacting zone.

13. The method of treating a petroleum hydrocarbon in the presence of a particle-form solid contact mass material which comprises passing contact mass in a closed circuit including a hydrocarbon treating zone and a revivification zone and introducing heated petroleum hydrocarbons into a substantially compact column of said particle-form contact mass within said treating zone, continuously removing said solid from said zone without appreciable losses of hydrocarbon vapors with said solid and continuously conducting solid so removed to the revivification zone, regenerating the solid at high temperature in said revivification zone and returning it in such condition to said treating zone, substantially excluding combustion-supporting gases from entering the treating zone and collecting the vaporous hydrocarbon products of the treating step.

14. In a process for the catalytic conversion of hydrocarbons by passing the hydrocarbons in the vapor phase through a reaction zone filled with catalyst granules and maintained at a temperature suitable for the desired conversion, the improvement which consists in withdrawing used catalyst from said zone during the reaction and replacing catalyst thus withdrawn with active catalyst, thereby maintaining the volume of catalyst in said zone and the average activity thereof substantially constant throughout the reaction, maintaining a confined zone containing a supply of active catalyst and a similar zone containing an accumulation of used catalyst, each respectively associated with the catalyst replacement and withdrawal portions of the reaction zone, and maintaining in each of said zones an atmosphere of inert gas permeating the catalyst therein.

15. In a continuous process for the catalytic conversion of high boiling hydrocarbons to low boiling hydrocarbons within the gasoline boiling range, involving passing the high boiling hydrocarbons in the vapor phase through a conversion zone in contact with particles of a cracking catalyst and maintained at an elevated temperature suitable for the desired conversion, the improvement which consists in withdrawing used catalyst particles from the conversion zone during the reaction and replacing catalyst particles thus withdrawn with active catalyst particles, thereby maintaining the volume of catalyst in said zone and the average activity thereof substantially constant throughout the reaction, maintaining a confined intermediate sealing zone containing an accumulation of used catalyst thus withdrawn in proximity to but separate from the conversion zone, maintaining within said sealing zone an atmosphere of inert gas and purging the accumulated catalyst therein of entrained and adsorbed conversion products by circulating said inert gas therethrough, maintaining a body of spent catalyst particles withdrawn from said intermediate zone in contact with an oxygen-containing gas in a confined regenerating zone until the catalyst is revivified, and continuously and successively moving the catalyst particles through said conversion zone, intermediate purging and sealing zone, and regeneration zone thereby attaining the circulation of the catalyst at an elevated temperature throughout the process and the continuous production of a high quality gasoline at a substantial uniform rate and of substantial uniform quality.

16. In a continuous process for the catalytic conversion of high boiling hydrocarbons to low boiling hydrocarbons within the gasoline boiling range, involving passing the high boiling hydrocarbons in the vapor phase through a conversion zone in contact with a body of catalyst particles maintained at a temperature suitable for the desired conversion, the improvement which consists in continuously withdrawing used catalyst from the conversion zone during the reaction and continuously replacing catalyst particles thus withdrawn with active catalyst particles, thereby maintaining the volume of catalyst in said zone and the average activity thereof substantially constant throughout the reaction, maintaining a confined zone containing an accumulation of used catalyst thus withdrawn in proximity to but separate from the conversion zone, maintaining within said latter zone an atmosphere of inert gas and freeing the accumulated catalyst therein of entrained and adsorbed conversion products by circulating said inert gas therethrough.

17. A process as defined in claim 15 wherein a hot heat exchange medium is passed in close proximity to said moving bed to supply endothermic heat of cracking.

18. The continuous method of converting a liquid hydrocarbon oil into high quality gasoline by a process comprising catalytic cracking, which method comprises heating said oil to effect vaporization thereof and to effect heating thereof to a conversion temperature, introducing said heated vapors into a moving bed of catalyst in a conversion zone, introducing regenerated catalyst into said zone from a confined supply thereof disposed above the conversion zone and removing used catalyst from the bottom of said zone thereby continuously maintaining the volume and average catalytic activity of the bed of catalyst in said zone substantially constant throughout the conversion, withdrawing the used catalyst out of the path of the vapors through the conversion zone to a purging and sealing zone, passing an inert gas in contact with the hot withdrawn catalyst to remove hydrocarbons entrained with the catalyst, continuously regenerating said removed catalyst in a separate zone at high temperature and returning said high temperature regenerated catalyst to said confined supply of regenerated catalyst above said conversion zone, introducing an inert gas into said confined supply, and withdrawing the vaporous products from the conversion zone and fractionating them to recover a gasoline fraction.

19. The continuous method of converting a high-boiling liquid hydrocarbon oil into high-quality gasoline by a process comprising catalytic cracking which method comprises heating said oil to effect vaporization thereof, introducing said vapors into a moving bed of catalyst particles in a cracking zone at a pressure at least sufficiently high to overcome the frictional resistance by said bed to the flow of vapors therethrough, introducing regenerated catalyst partcles from a confined supply thereof disposed above the cracking zone into said zone and removing used catalyst particles from the bottom of said zone thereby continuously maintaining a bed of catalyst particles of both substantially constant volume and average catalytic activity in said zone throughout the conversion, withdrawing used catalyst out of the path of flow of the vapors through the cracking zone to a purging and sealing zone, removing hydrocarbons entrained with the withdrawn catalyst by passing an inert gas through the latter zone in contact with the catalyst therein, continuously regenerating said removed catalyst in a separate zone at high temperature and continuously returning said high temperature regenerated catalyst to said confined supply of regenerated catalyst above said conversion zone, introducing an inert gas into said confined supply to maintain an inert gaseous atmosphere therein, withdrawing the vaporous products from the conversion zone and fractionating them to recover a gasoline fraction.

20. The method of treating a petroleum hydrocarbon in the presence of a particle form solid contact material conditioned to induce the desired treating reaction which comprises passing said contact material in a closed circuit including a hydrocarbon treating zone and a regenerating zone thereabove, introducing heated hydrocarbons into a substantially compact column of said particle form contact material within said treating zone, continuously removing said solid from said treating zone without appreciable losses of hydrocarbon vapors with said solid, continuously conducting solid so removed to the said regenerating zone, regenertaing said solid at high temperature in said regenerating zone to restore said condition, passing said solid downwardly in said condition to said treating zone, substantially preventing passage of gases from said regenerating zone to said treating zone and collecting the vaporous hydrocarbon products of the treating step.

THOMAS P. SIMPSON.
JOHN W. PAYNE.
JOHN A. CROWLEY, Jr.

REFERENCES CITED

The following references are of record in the file of this patent:

UNITED STATES PATENTS

| Number | Name | Date |
|---|---|---|
| 2,183,301 | Bossner et al. | Dec. 12, 1939 |
| 1,473,491 | Manning | Nov. 6, 1923 |
| 1,724,982 | Trumble | Aug. 20, 1929 |
| 1,799,858 | Miller | Apr. 7, 1931 |
| 1,815,525 | Power | July 21, 1931 |
| 2,042,469 | Joseph | June 2, 1936 |
| 2,098,148 | Jarl | Nov. 2, 1937 |
| 2,086,561 | Keoppl | July 13, 1937 |
| 2,227,416 | Payne | Dec. 31, 1940 |
| 2,000,672 | Stratford et al. | May 7, 1935 |
| 2,065,643 | Brandt | Dec. 29, 1936 |

FOREIGN PATENTS

| Number | Country | Date |
|---|---|---|
| 255,159 | British | July 19, 1926 |
| 784,885 | French | May 6, 1935 |
| 23,045 | British | Aug. 24, 1911 |
| 254,011 | British | June 25, 1926 |